(12) United States Patent
Komori

(10) Patent No.: US 9,315,069 B2
(45) Date of Patent: Apr. 19, 2016

(54) WHEEL BEARING APPARATUS AND ITS PRE-PRESSURE MANAGING METHOD

(71) Applicant: NTN Corporation, Osaka-shi (JP)

(72) Inventor: Kazuo Komori, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/136,333

(22) Filed: Dec. 20, 2013

(65) Prior Publication Data

US 2014/0103702 A1   Apr. 17, 2014

Related U.S. Application Data

(63) Continuation of application No. PCT/JP2012/065690, filed on Jun. 20, 2012.

(30) Foreign Application Priority Data

Jun. 20, 2011 (JP) ................. 2011-135958
Aug. 2, 2011 (JP) ................. 2011-169077
Jun. 8, 2012 (JP) ................. 2012-130707

(51) Int. Cl.

| | | |
|---|---|---|
| *F16C 19/55* | (2006.01) | |
| *F16C 35/06* | (2006.01) | |
| *B27B 27/00* | (2006.01) | |
| *B60B 27/00* | (2006.01) | |
| *F16C 35/063* | (2006.01) | |
| *F16C 19/38* | (2006.01) | |

(52) U.S. Cl.
CPC ........... *B60B 27/001* (2013.01); *B60B 27/0084* (2013.01); *F16C 19/55* (2013.01); *F16C 35/063* (2013.01); *B60B 2380/73* (2013.01); *B60B 2380/82* (2013.01); *F16C 19/386* (2013.01); *Y10T 29/49696* (2015.01)

(58) Field of Classification Search
CPC ...... F16C 35/063; F16C 19/55; F16C 19/386; F16C 2326/02; B60B 27/001; B60B 27/0084; B60B 2380/73; B60B 2380/82; Y10T 29/49696
See application file for complete search history.

(56) References Cited

U.S. PATENT DOCUMENTS 5,984,422 A    11/1999  Seifert
7,263,904 B2 *  9/2007  Yoshida et al. .......... 73/862.331
(Continued)

FOREIGN PATENT DOCUMENTS

JP    2002-081453    3/2002
JP    2002-139060    5/2002
(Continued)

*Primary Examiner* — Alan B Waits
(74) *Attorney, Agent, or Firm* — Harness, Dickey & Pierce, P.L.C.

(57) ABSTRACT

A wheel bearing apparatus has an outer member, an inner member and double row rolling elements. A coupler ring is fit onto the wheel hub. The coupler ring inner circumferential splined portion has a plurality of spline recesses and spline projections. The plurality recesses and projections mate with a hub splined portion formed on the inner side outer circumference of the cylindrical portion of the wheel hub. An axial cross-section of the inner-side end of each spline projection of the hub splined portion is formed by a single circular arc with a predetermined radius of curvature "R". The radius of curvature "R" is larger than a dimension "A", measured from the inner-side end face of the coupler ring to the inner-side edge "B" of each spline projection (R>A). Also, it is larger than the height "h" of each spline projection (R>h).

19 Claims, 11 Drawing Sheets

(56) References Cited

U.S. PATENT DOCUMENTS

| | | | |
|---|---|---|---|
| 7,497,631 B2* | 3/2009 | Shigeoka | 384/544 |
| 7,776,453 B2* | 8/2010 | Hirai et al. | 428/684 |
| 8,360,655 B2* | 1/2013 | Ozawa et al. | 384/544 |
| 2002/0051597 A1 | 5/2002 | Sera et al. | |
| 2007/0217728 A1 | 9/2007 | Kashiwagi et al. | |
| 2009/0028485 A1* | 1/2009 | Norimatsu et al. | 384/564 |
| 2010/0220946 A1* | 9/2010 | Ozawa et al. | 384/456 |
| 2011/0009199 A1* | 1/2011 | Yamauchi et al. | 464/106 |
| 2014/0038732 A1* | 2/2014 | Kohara et al. | 464/143 |

FOREIGN PATENT DOCUMENTS

| | | |
|---|---|---|
| JP | 2006-062437 | 3/2006 |
| JP | 2006-077830 | 3/2006 |
| JP | 2006-097818 | 4/2006 |
| WO | WO2006/035836 | 4/2006 |

* cited by examiner

Fig 3
(a)
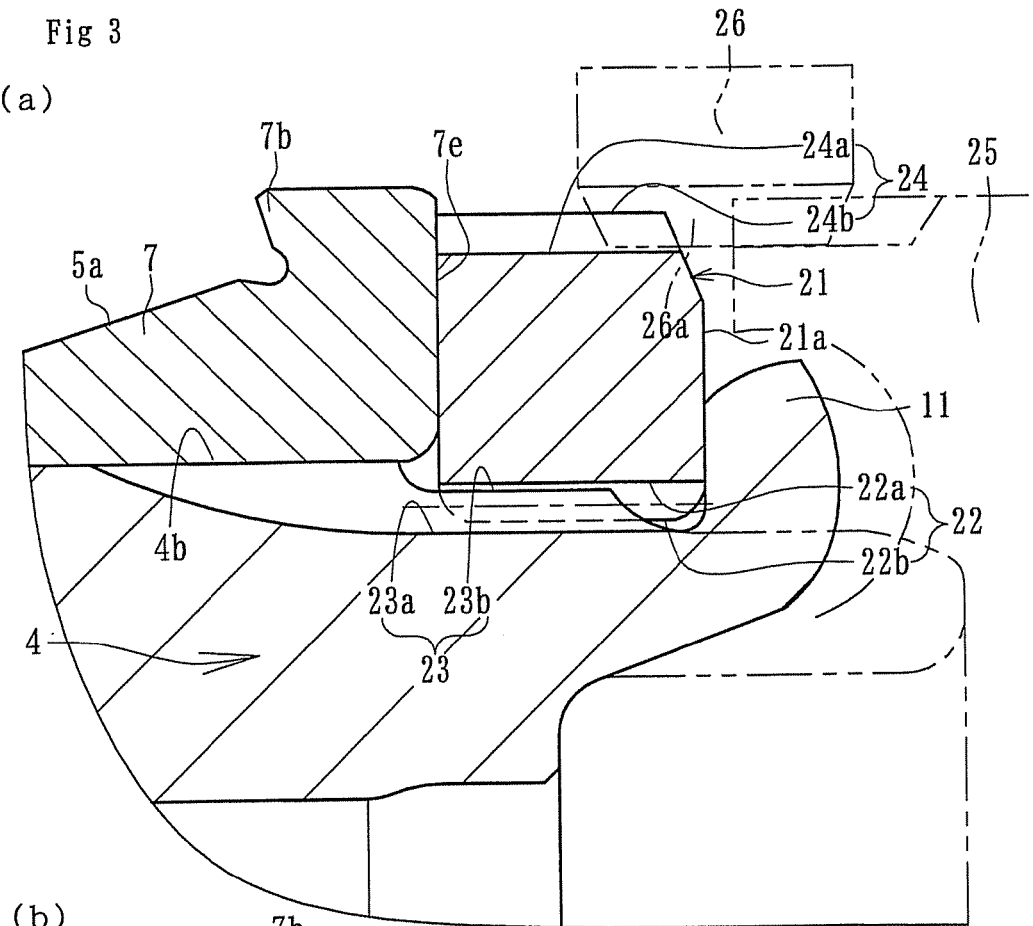
(b)
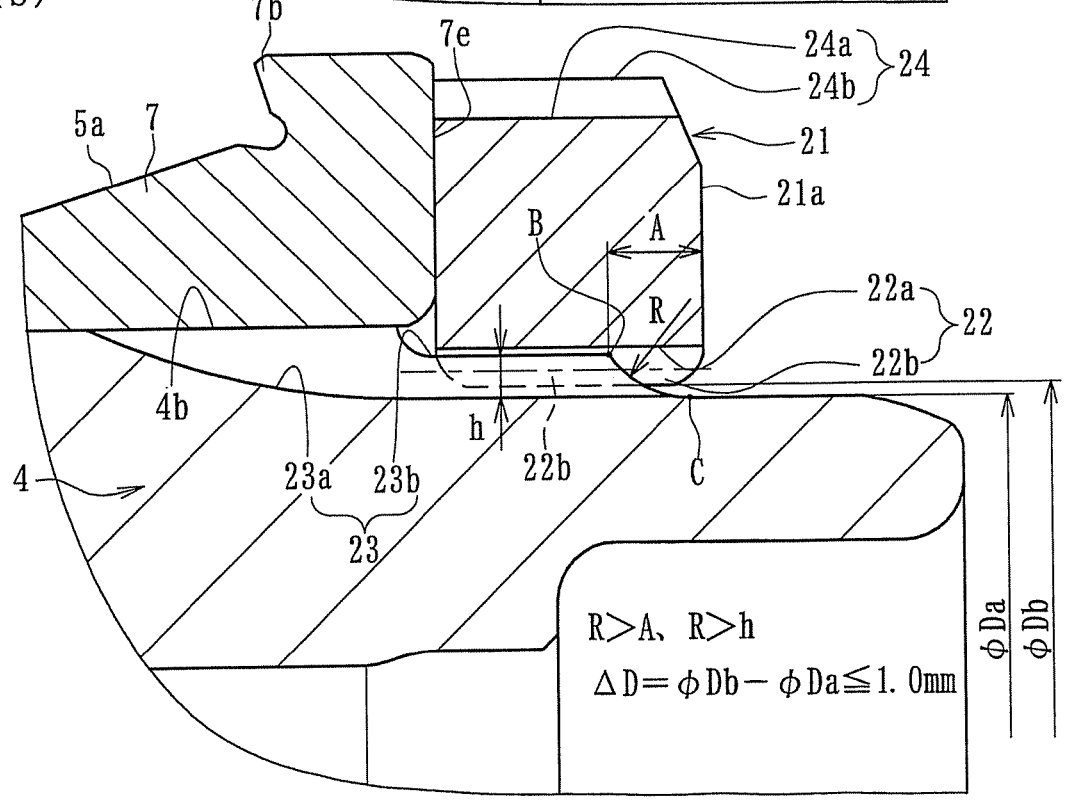
$R > A$, $R > h$
$\Delta D = \phi Db - \phi Da \leq 1.0\,mm$ (a)    (b)    H1≧H0

Fig 6
(a)
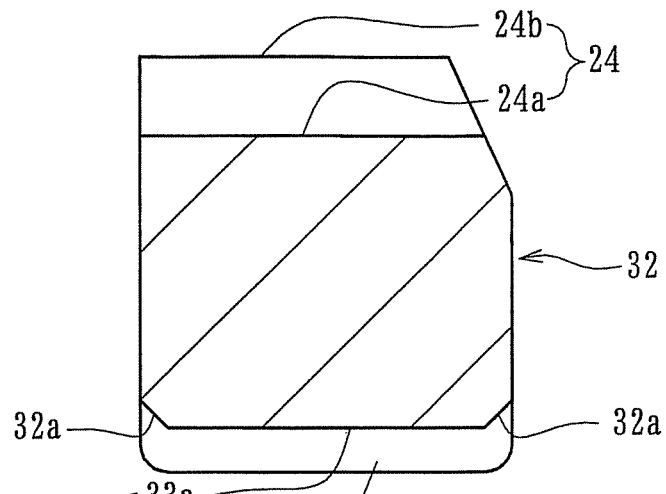
(b)
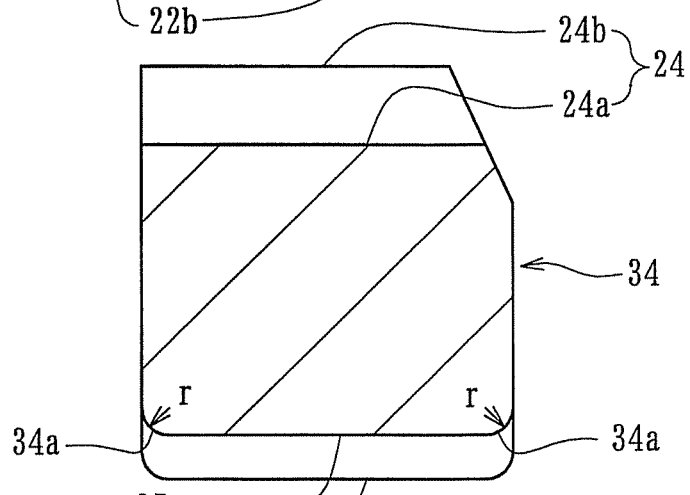
(c)
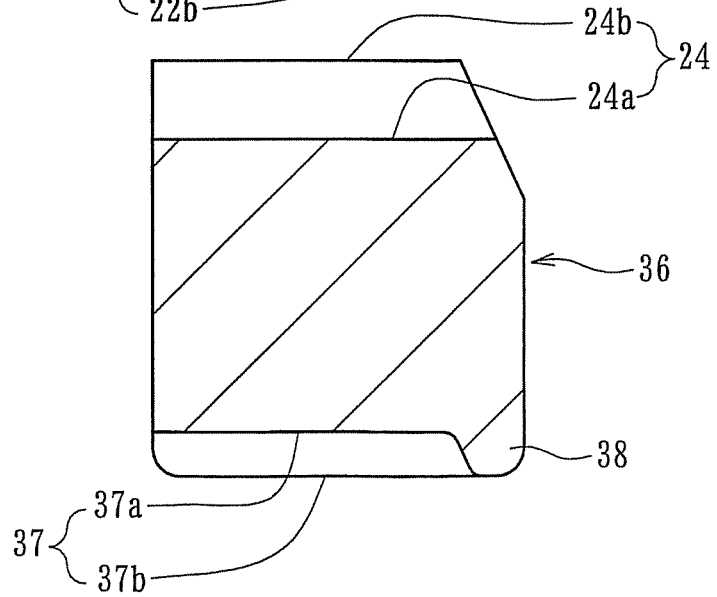

Fig 9
(a)
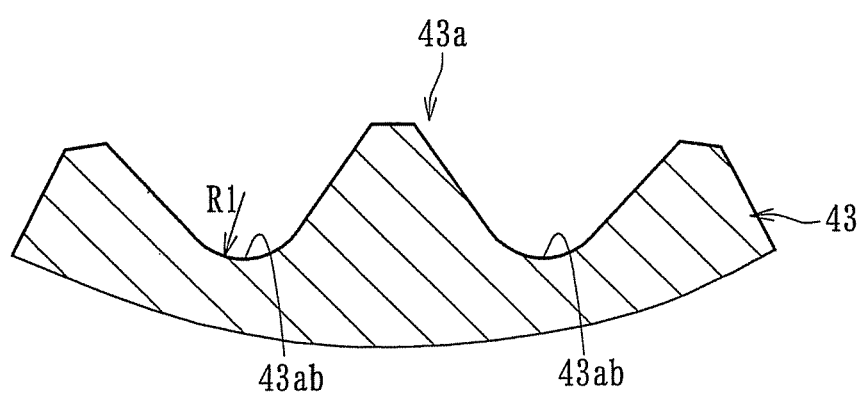
(b)
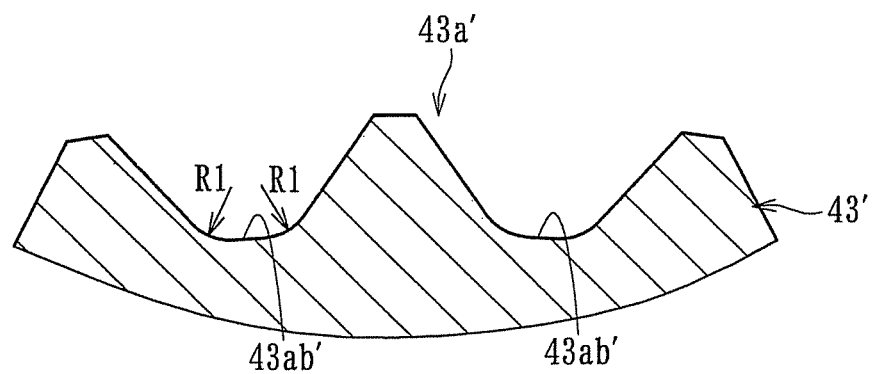

PRIOR ART

WHEEL BEARING APPARATUS AND ITS PRE-PRESSURE MANAGING METHOD

CROSS-REFERENCE TO RELATED APPLICATIONS

This application is a continuation of International Application No. PCT/JP2012/065690, filed Jun. 20, 2012, which claims priority to Japanese Application Nos. 2011-135958, filed Jun. 20, 2011; 2011-169077, filed Aug. 2, 2011; and 2012-130707, filed Jun. 8, 2012. The disclosures of the above applications are incorporating herein by reference.

FIELD

The present disclosure relates to a wheel bearing apparatus that freely rotationally supports a vehicle wheel, such as an automobile and, more particularly, to a wheel bearing apparatus with a clutch function to switch a wheel to a driving mode or a non-driving mode and a method for managing pre-pressure of the wheel bearing apparatus.

BACKGROUND

In certain 4-wheel drive automobiles, they can selectively switch front wheels or rear wheels to driving wheels or driven wheels using a clutch function provided with a wheel bearing apparatus. Such a wheel bearing apparatus 50, with the clutch function, is shown in FIG. 11. A wheel hub 52 is axially mounted on an axle 51 of a drive train. A double row tapered roller bearing 53 is a rolling bearing mounted on the wheel hub 52 at its axially center portion. A coupler ring 54 is arranged axially by the side of the double row tapered roller bearing 53. In addition, the wheel bearing apparatus 50 is coaxially supported on the axle 51, via a deep groove ball bearing 55 and a needle bearing 56 arranged between the axle 51 and the wheel hub 52. A reference character "G" denotes a slidable gear ring.

The wheel hub 52 has a cylindrical portion 57 formed coaxially with the axle 51. A flange 58 radially extends from the cylindrical portion 57 near the outer-side end. A caulked portion 59 is formed by bending an inner-side end of the cylindrical portion 57 radially outward. A splined portion 60 has a plurality of spline recesses (spline grooves) 60a and a plurality of spline projections 60b alternately arranged with each other on the outer circumference of the cylindrical portion 57 near the caulked portion 59. The splined portion 60 is mated with an inner circumferential splined portion 61 formed on the inner circumference of the coupler ring 54. The flange 58 is formed with a plurality of through apertures 58a. Fastening members B0, such as bolts, are inserted into the apertures 58a to fasten a wheel (not shown).

The double row tapered roller bearing 53 has an inner ring 62 and an outer ring 63. Double row tapered rollers 64, 65 are arranged side by side in an axial direction between the inner ring 62 and the outer ring 63.

In more detail, the inner ring 62 has a first inner ring member 66 with a first raceway surface 66a. A second inner ring member 67 has a second raceway surface 67a. The first inner ring member 66 and the second inner ring member 67 are arranged so that they abut each other. An outer-side end face 66b abuts against a root portion of the flange 58 of the wheel hub 52. An inner-side end face 67b of the second inner ring member 67 abuts against an end face of the coupler ring 54. Accordingly, the coupler ring 54 and the inner ring 62 (first and second inner ring members 66, 67), forming the double row tapered roller bearing 53, are firmly secured so as not to be rotated relative to the wheel hub 52.

The outer ring 63 has a first raceway surface 63a, a second raceway surface 63b, and a flange portion 63c, extending radially outward. The flange portion 63c is adapted to be secured to a steering knuckle (suspension apparatus) of a vehicle. A numeral 68 denotes a sealing member.

The coupler ring 54 has a generally annular configuration and is axially arranged side by side with the second inner member 67. Thus, it abuts against the end face 67b of the second inner ring member 67. The outer circumference of the coupler ring 54 is formed with a plurality of spline recesses (spline grooves) 69a and a plurality of spline projections 69b, forming an outer circumferential splined portion 69. The outer circumferential splined portion 69 is adapted to be mated with a splined portion G1 of a gear ring G.

As shown in FIG. 12, the inner-side inner circumferential edge of the spline projection 61b, of the inner circumferential splined portion 61 of the coupler ring 54, is chamfered to form an inner-side chamfered portion 70, with a curved surface. The chamfered portion 70 is designed to be positioned inner-side of the splined portion 60 of the wheel hub 52. In particular, it is designed so that a distance L is smaller than a distance X. The distance L is a distance from the inner-side end face 71 of the coupler ring 54 to the outer-side end 71a of the chamfered portion 70. The distance X is a distance from the inner-side end face 71 of the coupler ring 54 to the end point 60c of the spline recess 60a of the splined portion 60 of the wheel hub 52. Thus, it is possible to increase the bending radius of the caulked portion 59, formed on the inner-side end of the cylindrical portion of the wheel hub 52, and accordingly effectively suppress the generation of cracks in the root of the caulked portion 59 (e.g., see Japanese Patent Publication No. 4466302).

In the prior art technology, a "V"-shaped configuration (shown by a dotted line in FIG. 12) is often caused at the root of the caulked portion 59 during the performing of the actual caulking machining. As a result, the deforming stress would be concentrated in the "V"-shaped portion of the caulked portion 59. Thus, the caulking strength would also be reduced.

SUMMARY

It is, therefore, an object of the present disclosure to provide a wheel bearing apparatus that can effectively prevent the generation of cracks during the caulking machining or use of the wheel bearing. Thus, this improves the durability of the wheel bearing apparatus.

Another object is to provide a wheel bearing apparatus and a method for managing pre-pressure of the wheel bearing apparatus. This can prevent the generation of excessive stress on the coupler ring while using the coupler ring with a moderately soft hardness and strength, to perform a stable pre-pressure management.

To achieve the object of the present disclosure, a wheel bearing apparatus comprises an outer member with double row outer raceway surfaces formed on its inner circumference. An inner member includes a wheel hub and at least one inner rings. The wheel hub is integrally formed on its one end with a wheel mounting flange. A cylindrical portion axially extends from the wheel mounting flange. The inner rings are press-fit onto the cylindrical portion of the wheel hub, via a predetermined interference. The outer circumference of the inner rings includes inner raceway surfaces corresponding to the outer raceway surfaces of the outer member. Double row rolling elements are freely rollably contained between the inner and outer raceway surfaces of the inner and outer members, via cages. A coupler ring is formed with an inner circumferential splined portion and an outer circumferential splined portion. The coupling ring is fit onto the end portion of the cylindrical portion of the wheel hub. The inner rings are axially secured on the wheel hub, via the coupler ring, by a caulked portion. The caulked portion is formed by plastically deforming the end of the cylindrical portion radially outward. The inner circumferential splined portion of the coupler ring includes a plurality of spline recesses and a plurality of spline projections (teeth) alternately formed with each other. The coupling ring splines are adapted to mate with a hub splined portion that includes a plurality of spline recesses and a plurality of spline projections (teeth). The spine recesses and projections are alternately formed on the inner-side outer circumference of the cylindrical portion of the wheel hub. The axial cross-section of the inner-side end of each spline projection of the hub splined portion is formed by a single circular arc with a predetermined radius of curvature "R". The radius of curvature "R" is larger than a dimension "A" from the inner-side end face of the coupler ring to the inner-side edge "B" of each spline projection (R>A) and is also larger than the height "h" of each spline projection (R>h).

In the wheel bearing apparatus, the inner rings are axially secured on the wheel hub, via the coupler ring by a caulked portion. The caulked portion is formed by plastically deforming the end of the cylindrical portion radially outward. The inner circumferential splined portion of the coupler ring includes a plurality of spline recesses and a plurality of spline projections alternately formed with each other. The coupler ring is adapted to mate with a plurality of spline recesses and a plurality of spline projections of a wheel hub. The splined portion is alternately formed on the inner-side of the outer circumference of the cylindrical portion of the wheel hub. The axial cross-section of the inner-side end of each spline projection of the hub splined portion is formed by a single circular arc with a predetermined radius of curvature "R". The radius of curvature "R" is larger than a dimension "A", from the inner-side end face of the coupler ring to the inner-side edge "B" of each spline projection (R>A). Also, it is also larger than the height "h" of each spline projection (R>h). The root portion of the caulked portion is formed with a large rounded configuration. Thus, it is possible to prevent the caulked portion from being formed with a "V"-shaped configuration liable to be subjected to stress-concentration. Accordingly, it is possible to provide a wheel bearing apparatus that can effectively suppress the generation of cracks on the root of the caulked portion of the wheel hub during caulking machining and during use of the wheel bearing apparatus. Thus, this improves the durability of the wheel bearing apparatus.

A groove diameter of the spline recess of the hub splined portion is "Da". An inner diameter of the spline projections of the inner circumferential spline of the coupler ring is "Db". "Db" is larger than "Da" (Db>Da). A difference "ΔD" between "Db" and "Da" (ΔD=Db−Da) is 1.0 mm or less. This makes it possible to reduce the strength of the caulking strength and its variation.

A tapered surface is formed on the inner circumference of at least an inner-side end of the spline projection of the inner circumferential splined portion of the coupler ring. A starting point "T" of the tapered surface is positioned within a range between the edge "B" of the spline projection of the hub splined portion and the bottom "C" of the spline recess. This makes it possible for the caulked portion to be smoothly deformed along the inner circumference of the coupler ring. Thus, this prevents the root portion of the caulked portion from being deformed as a "V"-shaped configuration liable to be subjected to stress-concentration.

A tapering chamfered portion is formed on a radially inward portion of at least an inner-side end of the coupler ring. The radial height "H1" of the chamfered portion is set larger than the height "H0" of the spline projection of the inner circumferential splined portion (H1≥H0). This makes it difficult for material of the root of the caulked portion to bite into the spline recess of the coupler ring and form spline projection on the caulked portion. Thus, it is possible to prevent stress-concentration on the spline projection formed on the caulked portion. Also, it is possible to prevent a reduction of the strength of the caulked portion when a load is applied on the caulked portion.

A tapering chamfered portion is formed on at least an inner-side end of the spline recesses of the inner circumferential splined portion of the coupler ring. A circular-arc chamfered portion of a predetermined radius of curvature is formed on at least an inner-side end of the spline recesses of the inner circumferential splined portion of the coupler ring. This makes it possible to increase the volume of the spline projections. Thus, this avoids the stress concentration to the spline projections.

A non-grooved portion is formed on the inner-side end of the coupler ring. It is formed before reaching the end of the coupler ring. This makes it difficult for the material that forms the root of the caulked portion from biting into the spline recess of the coupler ring during formation of the caulked portion. Also, it makes it possible to prevent the stress concentration.

The coupler ring is formed from steel containing carbon in an amount the same or less than that of medium-high carbon steel. The hardness of the outer circumferential splined portion is set the same as that of the inner circumferential splined portion. This prevents the generation of deformation and micro cracks on the coupler ring due to the generation of excessive stress. In addition, since plastic deformation is not easily caused in the coupler ring by the caulking operation, it is possible to accurately measure the amount of elastic deformation. Thus, this stably performs the pre-pressure management while suppressing variation in measurement.

The difference in surface hardness between the coupler ring and the wheel hub is at least 130 HV. This makes it possible to assure a desirable strength of the whole coupler ring not only in the outer circumferential splined portion but also in inner circumferential splined portion of the coupler ring. It also makes it possible to plastically deform the end of the cylindrical portion of the wheel hub during formation of the caulked portion. Also, it prevents the generation of troubles when caulking, such as micro cracks.

The coupler ring is formed of steel containing Cr of 0.9~1.2% by weight. The surface hardness of the coupler ring is set within a range of 392~600 HV. This makes it possible to increase the strength of the coupler ring. Thus, this prevents the generation of deformation and micro cracks during formation of the caulked portion.

The coupler ring is formed of steel containing carbon in the amount of 0.15~0.45% by weight. This makes it possible to form the splined portions with a moderate hardness. Thus, this assures desirable strength of the coupler ring.

The coupler ring is formed of chrome steel containing Cr of 0.9~1.2% by weight. It is hardened by the quench-and-temper treatment. This makes it possible to increase the strength of the coupler ring. It is also possible to prevent the generation of deformation and micro cracks during the caulking operation due to the generation of excessive stress in the coupler ring.

The coupler ring is formed from chrome molybdenum steel containing Mo of 0.15~0.3% by weight. This makes it possible to suppress brittleness of the coupler ring. Thus, this surely prevents the generation of micro cracks during caulking operation.

The bottom of the outer circumferential splined portion of the coupler ring is formed as a circular arc with a predetermined radius of curvature. This makes it possible to distribute the caulking force. Thus, this prevents the generation of cracks on the bottom of splines.

An outer joint member forming a constant velocity universal joint is connected to the inner member. The outer circumference of the outer joint member is formed with an axle-side splined portion with a same diameter and configuration as those of the outer circumferential splined portion of the coupler ring. The outer circumferential splined portion of the coupler ring and the axle-side splined portion are arranged coaxially with each other. The axle-side splined portion is mated with an inner circumferential splined portion of an axially slidable gear ring to switch the driving force.

The wheel hub is formed of medium-high carbon steel containing carbon amount of 0.40~0.80% by weight. The wheel hub is hardened by high frequency induction hardening so that a predetermined hardened layer is formed with a surface hardness of 58~64 HRC in a region of the wheel hub from the inner-side base of the wheel mounting flange to the cylindrical portion. The caulked portion is not hardened and remains as is with a surface hardness after forging. This makes it possible to easily form the caulked portion. Thus, this prevents the generation of micro cracks during the caulking operation. In addition, it is possible to increase the mechanical strength sufficient to resist a rotary bending load. Thus, this improves the durability of the wheel hub.

A method of managing pre-pressure of a wheel bearing apparatus comprises providing an outer member formed with a body mounting flange on its outer circumference. The mounting flange to be mounted on a knuckle forming part of a suspension apparatus of a vehicle. The outer member inner circumference has double row outer raceway surfaces. An inner member includes a wheel hub and at least one inner rings. The wheel hub is integrally formed, on its one end, with a wheel mounting flange. A cylindrical portion axially extends from the wheel mounting flange. The inner rings are press-fit onto the cylindrical portion of the wheel hub, via a predetermined interference. The inner rings outer circumference includes inner raceway surfaces corresponding to the outer raceway surfaces of the outer member. Double row rolling elements are freely rollably contained between the inner and outer raceway surfaces of the inner and outer members, via cages. The method comprises steps of axially securing the inner rings, via a coupler ring, by applying a predetermined bearing pre-pressure. The pre-pressure is applied by a caulked portion that is formed by plastically deforming an end of the cylindrical portion of the wheel hub radially outward. A bearing clearance is measured before formation of the caulked portion. Heights of the coupler ring are measured from a reference surface before and after the caulking. An amount of reduction of the bearing clearance is calculated from a difference in heights $\Delta W$ (W0−W1) using a regression formula where a relationship between an amount of elastic deformation and the amount of reduction of the bearing clearance has been previously defined. The bearing clearance after the caulking is calculated by subtracting the amount of reduction of the bearing clearance from the bearing clearance before the caulking.

The method for managing pre-pressure of a wheel bearing apparatus comprises steps of measuring heights of the coupler ring from a reference surface before and after the caulking. An amount of reduction of the bearing clearance is calculated from a difference in heights $\Delta W$ (=W0−W1) using a regression formula where a relationship between an amount of elastic deformation and the amount of reduction of the bearing clearance has been previously defined. The bearing clearance is calculated after the caulking by subtracting the amount of reduction of the bearing clearance from the bearing clearance before the caulking. Thus, it is possible to stably manage the amount of pre-pressure indirectly although the bearing clearance after caulking is a negative clearance.

The wheel bearing apparatus of the present disclosure comprises an outer member formed with double row outer raceway surfaces on its inner circumference. An inner member includes a wheel hub and at least one inner ring. The wheel hub is integrally formed, on its one end, with a wheel mounting flange. A cylindrical portion axially extends from the wheel mounting flange. The inner rings are press-fit onto the cylindrical portion of the wheel hub, via a predetermined interference. The inner ring outer circumference includes inner raceway surfaces corresponding to the outer raceway surfaces of the outer member. Double row rolling elements are freely rollably contained between the inner and outer raceway surfaces of the inner and outer members, via cages. A coupler ring is formed with an inner circumferential splined portion and an outer circumferential splined portion. The coupler ring is fit onto the end portion of the cylindrical portion of the wheel hub. The inner rings are axially secured on the wheel hub, via the coupler ring, by a caulked portion. The caulked portion is formed by plastically deforming the end of the cylindrical portion radially outward. The inner circumferential splined portion of the coupler ring comprises a plurality of spline recesses and a plurality of spline projections alternately formed with each other. The recesses and projections are adapted to mate with a hub splined portion including a plurality of spline recesses and a plurality of spline projections, alternately formed with each other on the inner-side outer circumference of the cylindrical portion of the wheel hub. The axial cross-section of the inner-side end of each spline projection of the hub splined portion is formed by a single circular arc with a predetermined radius of curvature "R". The radius of curvature "R" is larger than a dimension "A". "A" is measured from the inner-side end face of the coupler ring to the inner-side edge "B" of each spline projection (R>A). It is also larger than the height "h" of each spline projection (R>h). The root portion of the caulked portion is formed with a large rounded configuration. Thus, this prevents the caulked portion from being formed with a "V"-shaped configuration liable to be subjected to stress-concentration. Accordingly, it is possible to provide a wheel bearing apparatus that can effectively suppress the generation of cracks on the root of the caulked portion of the wheel hub during caulking machining and during use of the wheel bearing apparatus. Thus, this improves the durability of the wheel bearing apparatus.

The method of managing pre-pressure of a wheel bearing apparatus includes an outer member formed on its outer circumference, with a body mounting flange. The body mounting flange is to be mounted on a knuckle forming part of a suspension apparatus of a vehicle. The outer member inner circumference has double row outer raceway surfaces. An inner member includes a wheel hub and at least one inner ring. The wheel hub is integrally formed, on its one end, with a wheel mounting flange. A cylindrical portion axially extends from the wheel mounting flange. The at least one inner ring is press-fit onto the cylindrical portion of the wheel hub, via a predetermined interference. The at least one ring outer circumference includes inner raceway surfaces corresponding to the outer raceway surfaces of the outer member. Double row rolling elements are freely rollably contained between the inner and outer raceway surfaces of the inner and outer members, via cages. The method comprises steps of axially securing the inner rings, via a coupler ring, by applying a predetermined bearing pre-pressure by a caulked portion. The caulked portion is formed by plastically deforming an end of the cylindrical portion of the wheel hub radially outward. A bearing clearance is measured before formation of the caulked portion. Heights of the coupler ring are measured from a reference surface before and after the caulking. An amount of reduction of the bearing clearance is calculated from a difference in heights ΔW (=W0−W1) using a regression formula where a relationship between an amount of elastic deformation and the amount of reduction of the bearing clearance has been previously defined. The bearing clearance is calculated after the caulking by subtracting the amount of reduction of the bearing clearance from the bearing clearance before the caulking. Accordingly, it is possible to stably manage the amount of pre-pressure indirectly although the bearing clearance after caulking is a negative clearance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3(a) is a partially enlarged view of the caulked portion of FIG. 1.

FIG. 3(b) is a partially enlarged view of a condition before caulking.

Figure 4:
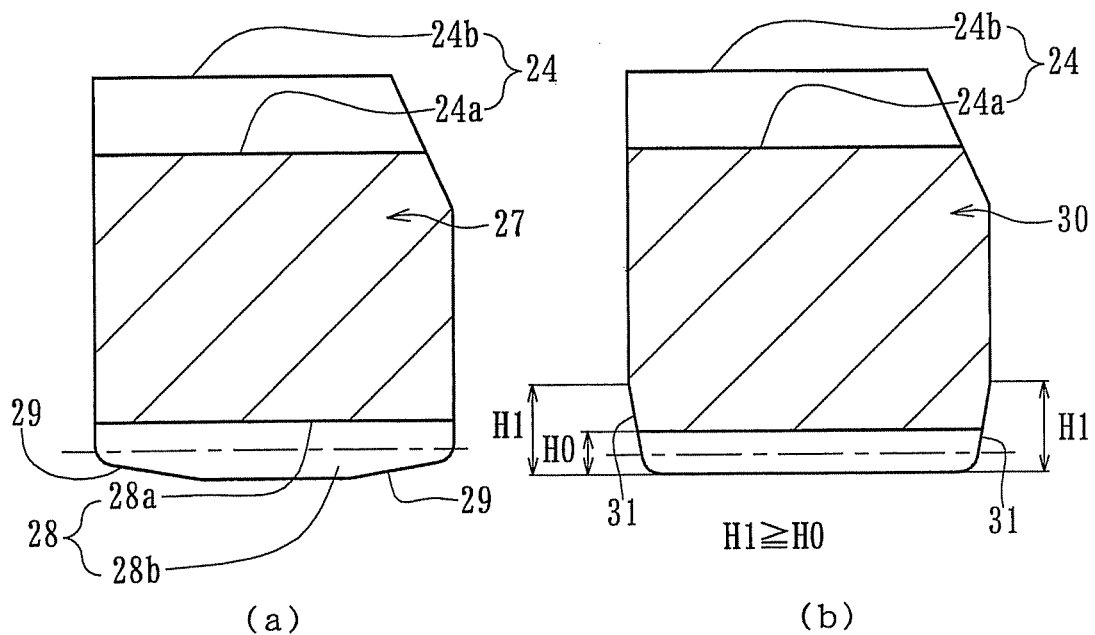
FIG. 4(a) is a longitudinal section view of a modification of the coupler ring of FIG. 3.
FIG. 4(b) is a longitudinal section view of another modification of the coupler ring of FIG. 3.

FIGS. 6(a)~(c) are longitudinal section views of other modifications of the coupler ring of FIG. 4(a).

Figure 7:
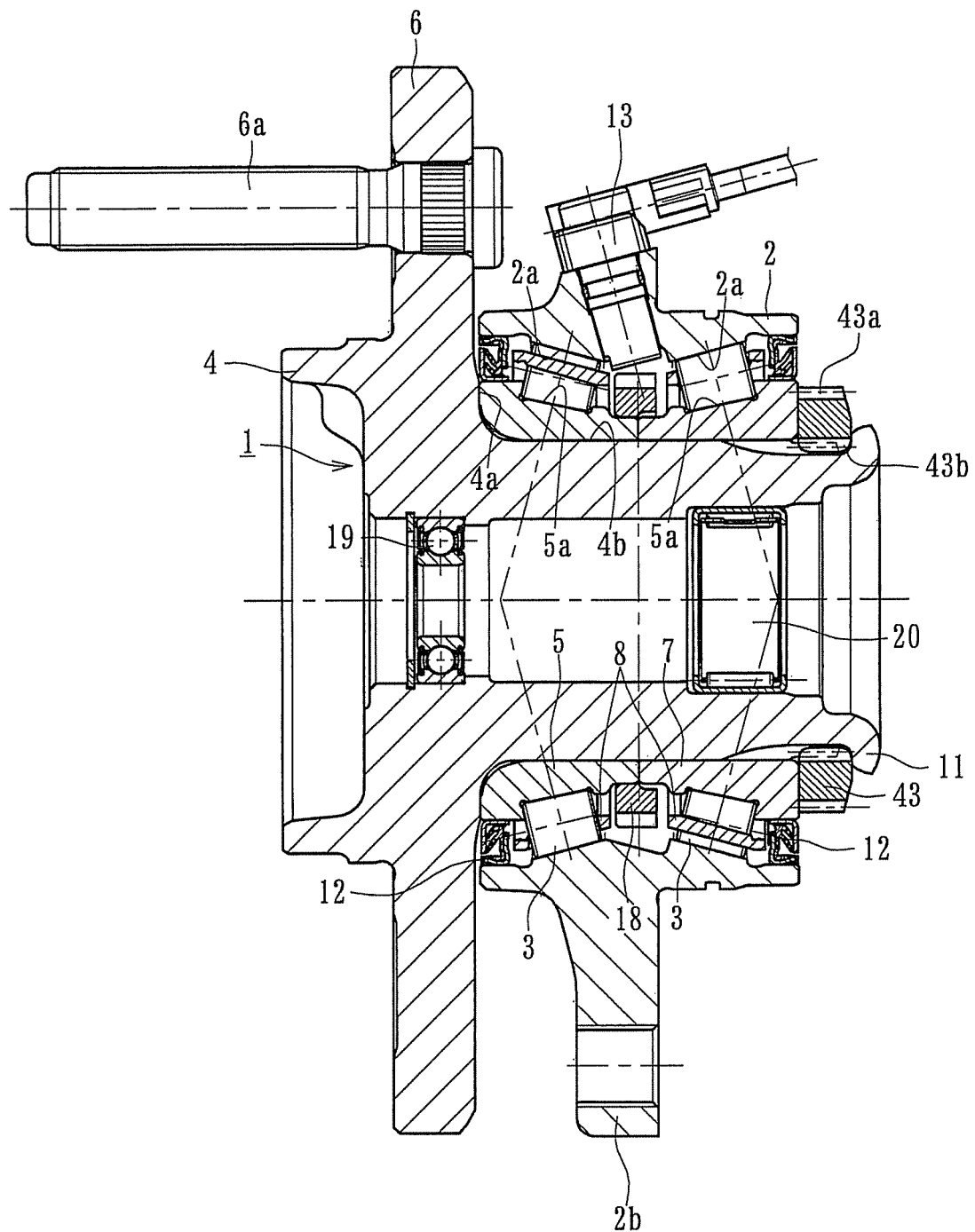

FIG. 7 is a longitudinal section view of a second embodiment of the wheel bearing apparatus.

Figure 8:
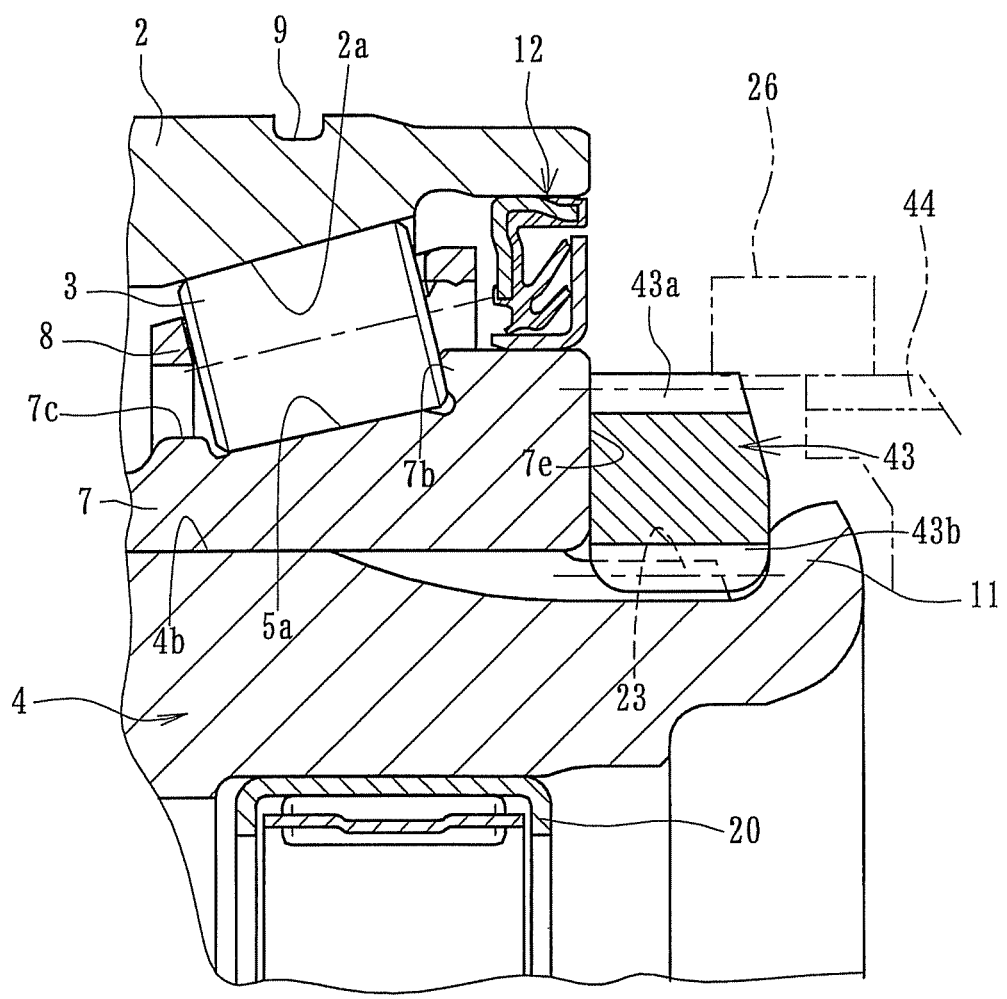

FIG. 8 is a partially enlarged view of the caulked portion of FIG. 7.

FIG. 9(a) is a cross-section view of the coupler ring.

FIG. 9(b) is a cross-section view of a modification of FIG. 9(a).

Figure 10:
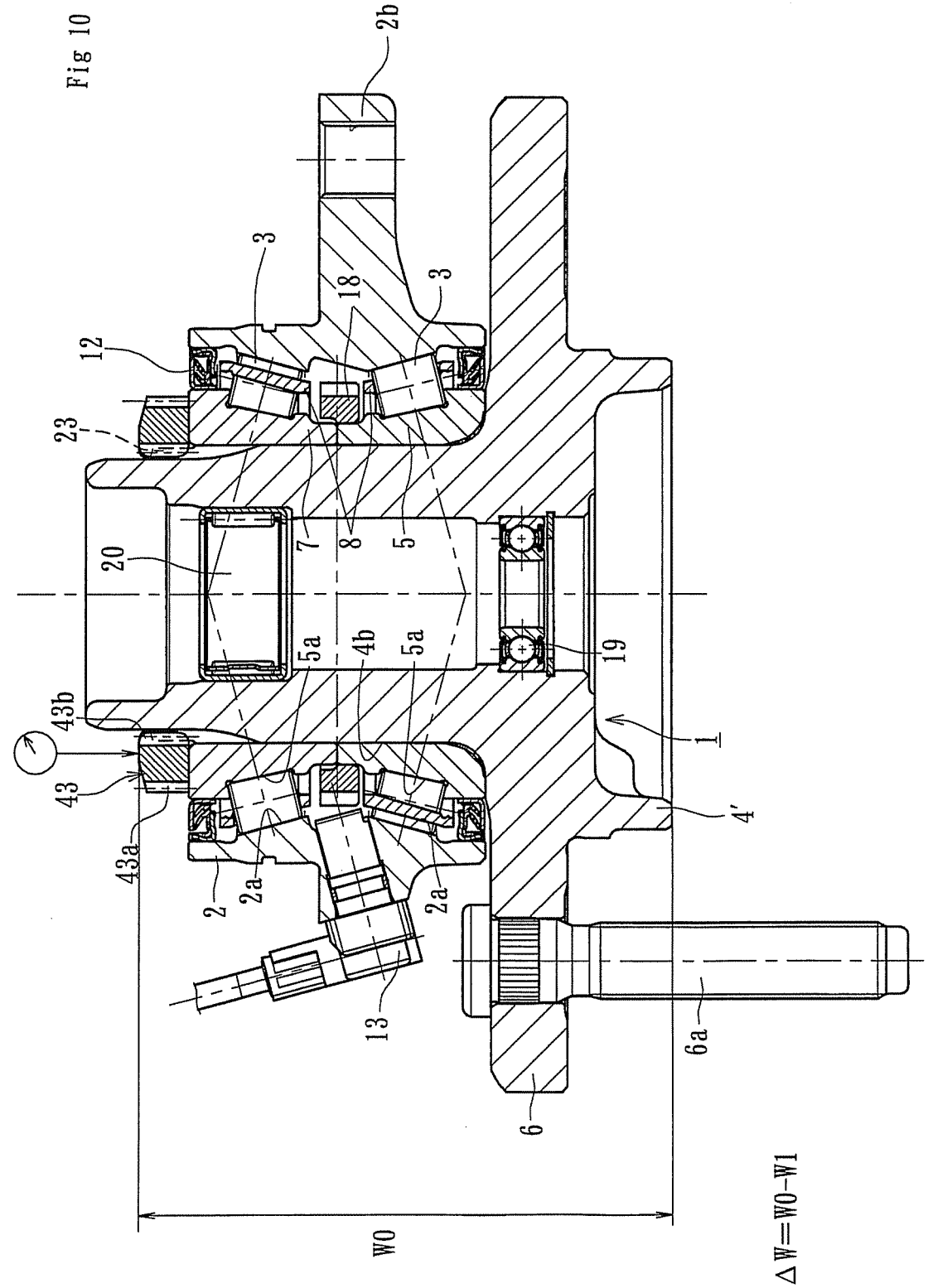

FIG. 10 is a longitudinal section view of the wheel bearing apparatus before caulking.

Figure 11:
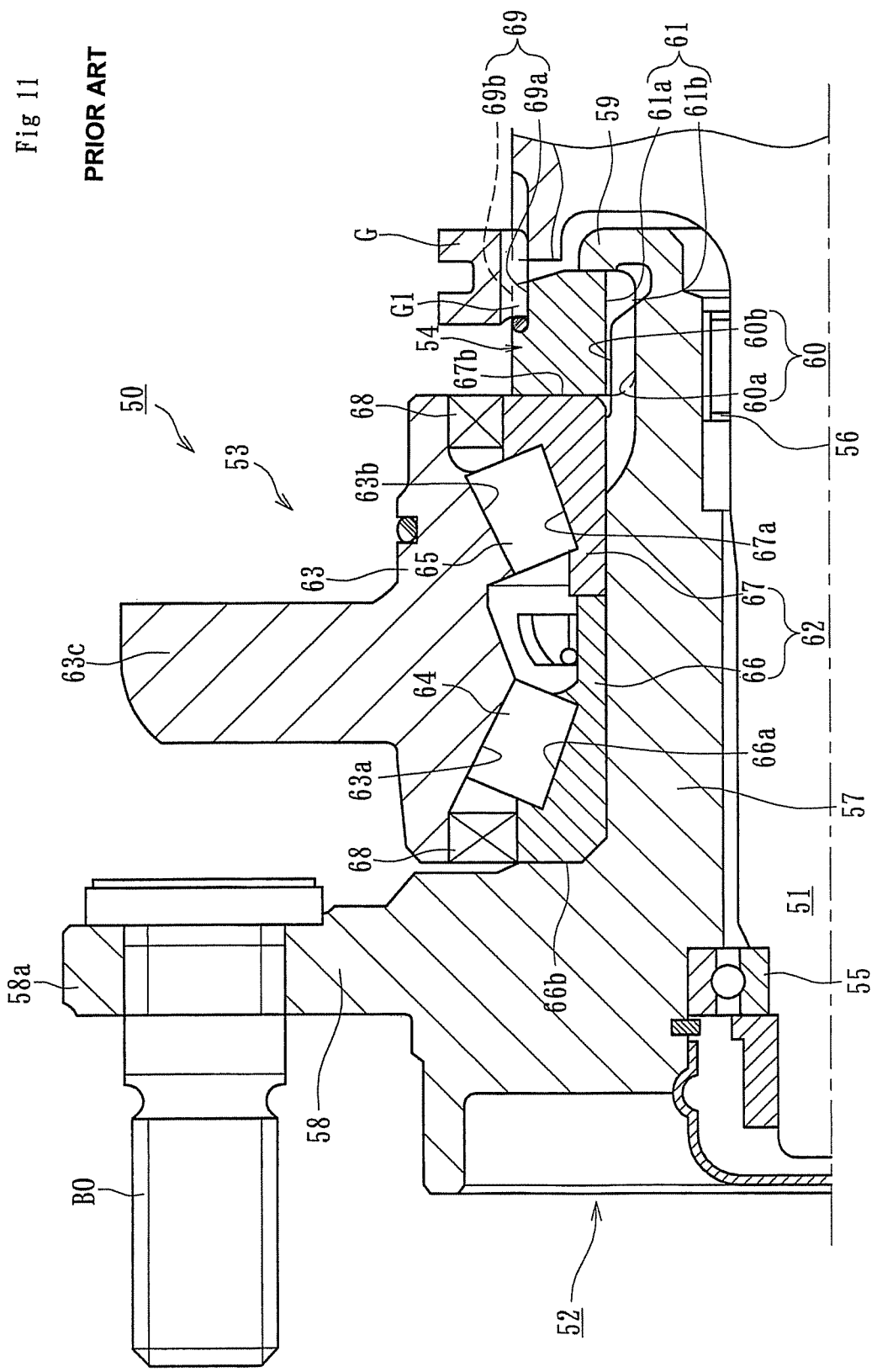

FIG. 11 is a longitudinal section view of a prior art wheel bearing apparatus.

Figure 12:
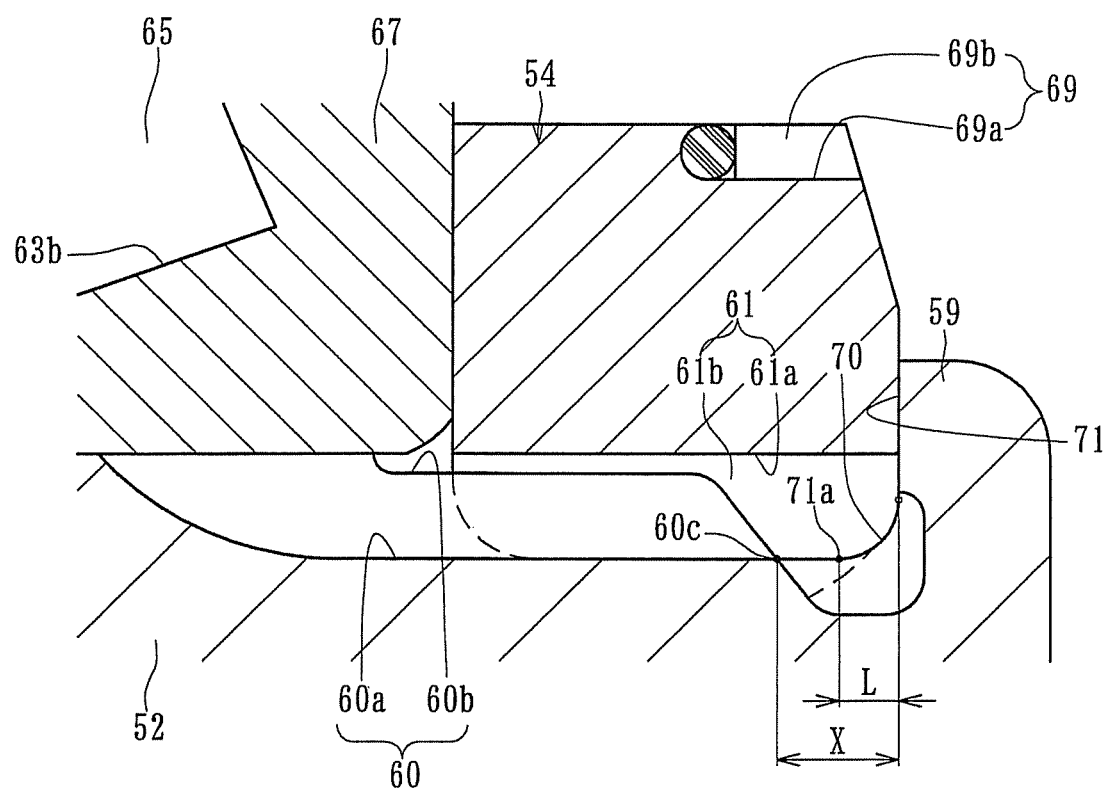

FIG. 12 is a partially enlarged view of FIG. 11.

DETAILED DESCRIPTION

A wheel bearing apparatus comprises an outer member integrally formed with a body mounting flange on its outer circumference. The outer member inner circumference includes double row outer raceway surfaces. An inner member includes a wheel hub and one pair of inner rings. The wheel hub is integrally formed, on its one end, with a wheel mounting flange. A cylindrical portion axially extends from the wheel mounting flange. The inner rings are press-fit onto the cylindrical portion of the wheel hub, via a predetermined interference. The inner rings outer circumference includes tapered inner raceway surfaces corresponding to the double row outer raceway surfaces. Double row tapered rollers are freely rollably contained between the inner and outer raceway surfaces of the inner and outer members, via cages. A coupler ring is formed with an inner circumferential splined portion and an outer circumferential splined portion. The coupling ring is fit onto the end portion of the cylindrical portion of the wheel hub. The inner rings are axially secured on the wheel hub, via the coupler ring, by a caulked portion. The caulked portion is formed by plastically deforming the end of the cylindrical portion radially outward. The inner circumferential splined portion of the coupler ring comprises a plurality of spline recesses and a plurality of spline projections alternately formed with each other. The recesses and projections are adapted to mate with a hub splined portion including a plurality of spline recesses and a plurality of spline projections. The plurality of spines and projections are alternately formed on the inner-side outer circumference of the cylindrical portion of the wheel hub. The axial cross-section of the inner-side end of each spline projection of the hub splined portion is formed by a single circular arc with a predetermined radius of curvature "R". The radius of curvature "R" is larger than a dimension "A". The dimension "A" is measured from the inner-side end face of the coupler ring to the inner-side edge "B" of each spline projection (R>A). The radius of curvature is also larger than the height "h" of each spline projection (R>h). When a groove diameter of the spline recess of the hub splined portion is "Da" and an inner diameter of the spline projections of the inner circumferential spline of the coupler ring is "Db", it is set so that "Db" is larger than "Da" (Db>Da). A difference "ΔD" that exist between "Db" and "Da" (ΔD=Db−Da) is 1.0 mm or less.

Preferable embodiments of the present disclosure will be hereinafter described with reference to the drawings.

Figure 1:
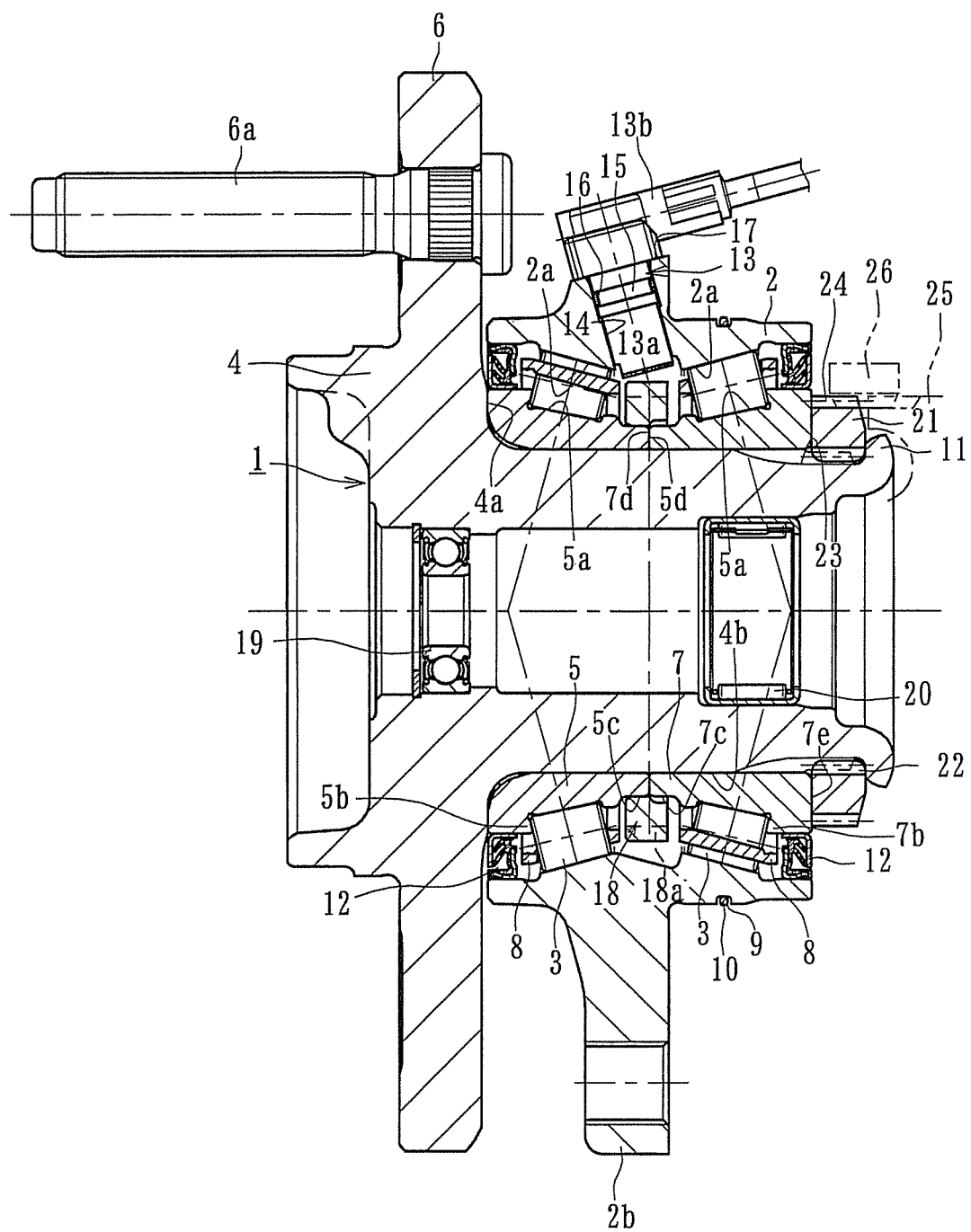
FIG. 1 is a longitudinal section view of a first embodiment of a wheel bearing apparatus.
Figure 2:
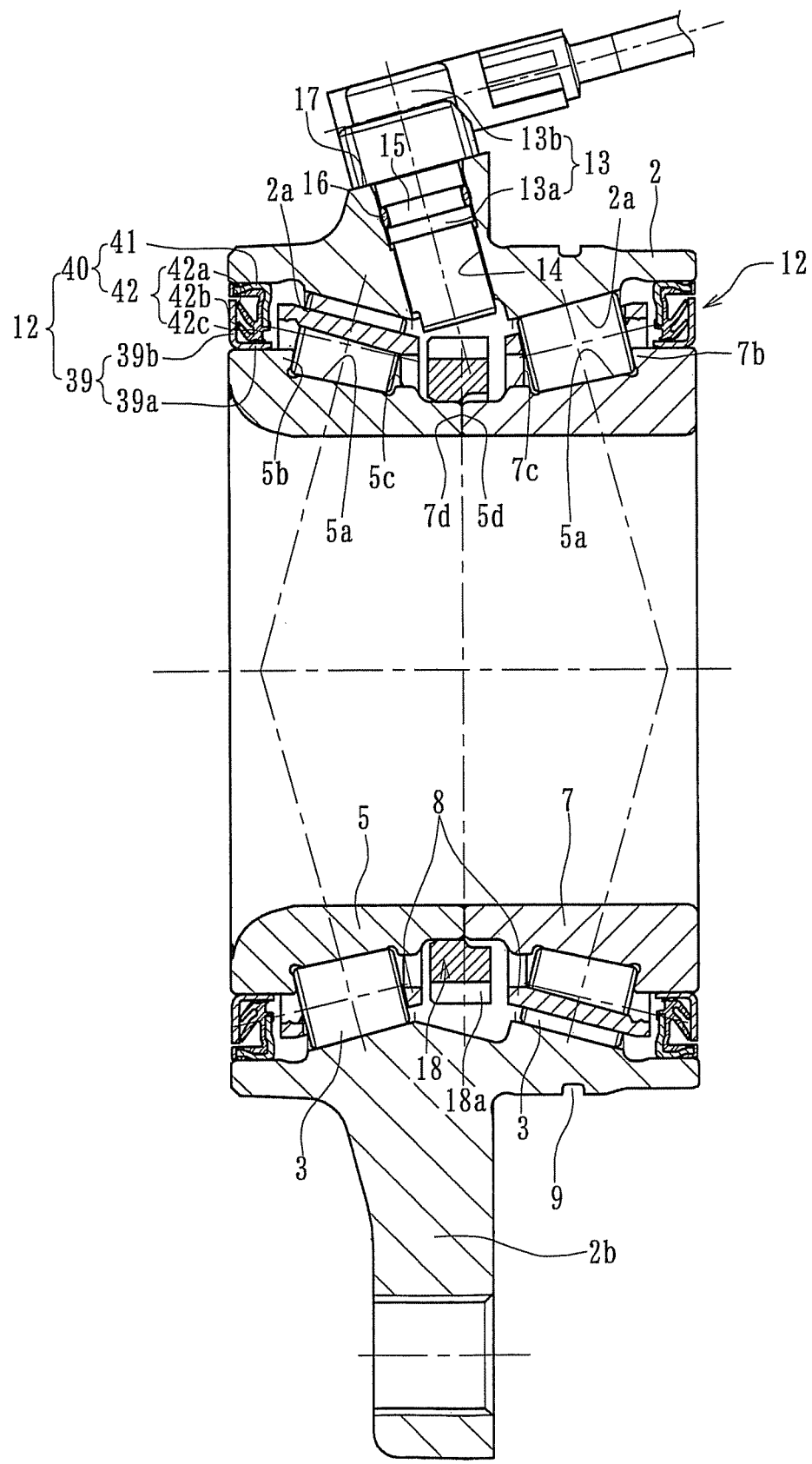
FIG. 2 is a longitudinal section view of the bearing portion of FIG. 1.
Figure 5:
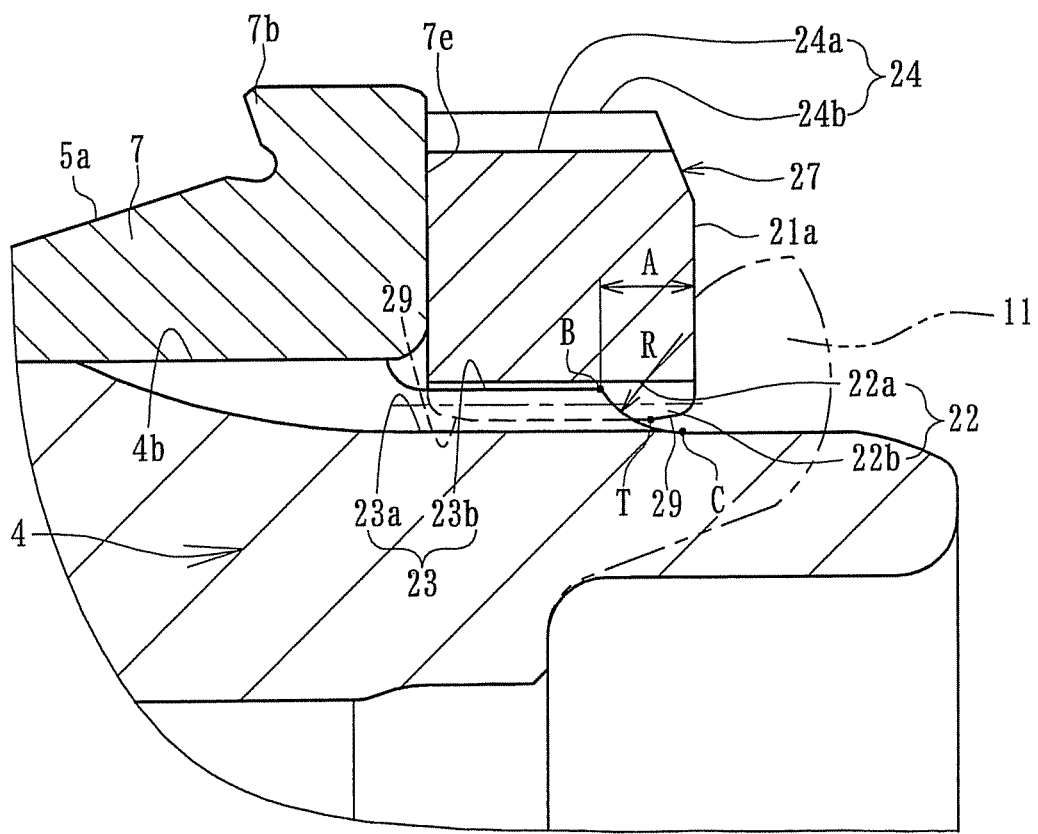
FIG. 5 is a partially enlarged view of an example using the coupler ring of FIG. 4(a) before caulking.

FIG. 1 is a longitudinal section view of a first embodiment of the wheel bearing apparatus. FIG. 2 is a longitudinal section view of the bearing portion of FIG. 1. FIG. 3(a) is a partially enlarged view of the caulked portion of FIG. 1. FIG. 3(b) is a partially enlarged view of a condition before caulking. FIG. 4(a) is a longitudinal section view of a modification of the coupler ring of FIG. 3. FIG. 4(b) is a longitudinal section view of another modification of the coupler ring of FIG. 3. FIG. 5 is a partially enlarged view of an example using the coupler ring of FIG. 4(a) before caulking. FIGS. 6(a)~(c) are longitudinal section views of other modifications of the coupler ring of FIG. 4(a). In the description of the present disclosure, an outer-side of the wheel bearing apparatus, when it is mounted on a vehicle, is referred to as the "outer-side" (left-side in drawings). An inner-side of a bearing apparatus, when it is mounted on a vehicle, is referred to as the "inner-side" (right-side in drawings)

The wheel bearing apparatus includes an inner member 1, an outer member 2, and double row rolling elements (tapered rollers) 3, 3 rollably contained between the inner and outer members 1, 2. The inner member 1 includes a wheel hub 4 and a pair of inner rings 5, 7 secured on the wheel hub 4, via plastic deformation of the wheel hub 4.

The wheel hub 4 is integrally formed on its outer-side end with a wheel mounting flange 6. The wheel mounting flange mounts a wheel (not shown). A cylindrical portion 4b extends axially from the wheel mounting flange 6, via a shoulder portion 4a. Hub bolts 6a are also equidistantly arranged along the periphery of the wheel mounting flange 6.

Each of the pair of inner rings 5, 7 is formed with a tapered inner raceway surface 5a on its outer circumference. Each pair of inner rings is press-fit onto the cylindrical portion 4b of the wheel hub 4. As shown in the enlarged view of FIG. 2, larger ribs 5b, 7b are formed on larger diameter sides of the inner raceway surfaces 5a, 5a to guide the rolling elements 3, 3. Smaller ribs 5c, 7c are formed on smaller diameter sides of the inner raceway surfaces 5a, 5a to prevent falling-off of the rolling elements 3, 3. Both the inner rings 5, 7 are mounted on the cylindrical portion 4b of the wheel hub with the smaller-side end faces being abutting each other to form a double row tapered roller bearing of the back-to-back duplex bearing.

The outer member 2 is integrally formed with a body mounting flange 2b on its outer circumference. The body mounting flange 2b is to be mounted on a knuckle (not shown). The outer member inner circumference includes double row tapered outer raceway surfaces 2a, 2a. The double row tapered rollers 3, 3 are freely rollably contained between the inner and outer raceway surfaces of the inner and outer members 1 and 2, via cages via cages 8. Sealing between the knuckle and the outer member 2 can be attained by an elastic ring 10, such as an O-ring, fit into an annular groove 9, formed on the outer circumference of the outer member 2.

The wheel hub 4 is made of medium/high carbon steel (JIS SC-carbon steel for machine structural use) including carbon of 0.40~0.80% by weight such as S53C. It is hardened by high frequency induction hardening so that a region from the shoulder portion 4a to the cylindrical portion 4b has surface hardness of 50~64 HRC. The inner rings 5, 7 and rolling elements 3 are formed from high carbon chrome steel, such as SUJ2, and hardened to their core by dip quenching to have a hardness of 58~64 HRC. The caulking portion 11, described later, remains in a non-hardened condition with a surface hardness after forging. This makes the caulking operation easy and prevents the generation of micro cracks during the caulking operation. Also, it increases the durability of the wheel hub 4 while providing sufficient mechanical strength against the rotary bending load applied to the wheel mounting flange 6.

Similarly to the wheel hub 4, the outer member 2 is made of medium/high carbon steel including carbon of 0.40~0.80% by weight, such as S53C. It is hardened by high frequency induction hardening so that at least the double row outer raceway surfaces 2a, 2a have a surface hardness of 58~64 HRC. Seals 12, 12 are mounted within annular openings formed between the outer member 2 and inner rings 5, 7. The seals prevent leakage of grease contained in the bearing and the entry of rain water and dust into the bearing from the outside.

The seal 12 includes a slinger 39 and an annular sealing plate 40 and is formed as a so-called "pack seal". The slinger 39 is press-formed of a ferromagnetic steel plate, such as a ferritic stainless steel sheet (JIS SUS 430 etc.) or preserved cold rolled steel sheet (JIS SPCC etc.), with a substantially L-shaped longitudinal section. A cylindrical portion 39a is press-fit into the larger rib portions 7b (5b) of the inner rings 5, 7. A standing portion 39b extends radially outward from the cylindrical portion 39a.

The sealing plate 40 includes a metal core 41 fit into the end of the outer member 2. A sealing member 42 is integrally adhered to the metal core 41, via vulcanized adhesion. The metal core 41 is press-formed of austenitic stainless steel sheet or preserved cold rolled steel sheet with a substantially L-shaped longitudinal section.

Sealing member 42 is formed of synthetic rubber such as NBR (acrylonitrile-butadiene rubber) etc. It is integrally formed with a pair of side lips 42a, 42b that angularly extends radially outward. A grease lip 42c angularly extends toward inside of the bearing. The side lips 42a, 42b are in sliding contact with the inner-side surface of the standing portion 39b of the slinger 39, via a predetermined axial interface. The grease lip 42c is in sliding contact with the cylindrical portion 39a of the slinger 39, via a predetermined radial interference. There are, other than NBR, examples of material of the sealing member 42 such as HNBR (hydrogenation acrylonitric-butadien rubber), EPDM (ethylene propylene rubber), ACM poly-acrylic rubber) superior in heat and chemical resistance, FKM (fluororubber) or silicone rubber.

In this embodiment, a rotational speed sensor 13 is inserted into a sensor insertion aperture 14. The aperture 14 extends radially between the outer raceway surfaces 2a and 2a of the outer member 2. The rotational speed sensor 13 is embedded in synthetic resin by injection hardening. It comprises an IC circuit incorporated with a Hall element, magnetic resistance element (MR element), and a waveform shaping circuit to shape the output waveform of the magnetic detecting element. The rotational speed sensor 13 includes an insertion portion 13a to be inserted into the insertion aperture 14. A non-insertion portion 13b is positioned outside of the outer member 2. An annular groove 15 is formed on the outer circumference of the insertion portion 13a. An elastic ring 16, such as O-ring etc., is fit into the groove 15. The non-insertion portion 13b is configured so that it sits on the sensor mounting portion 17 of the outer member 2. It is fastened thereto via a mounting piece (not shown) extending laterally.

A pulser ring 18 is secured on the outer circumference of the smaller rib 5c of the outer-side inner ring 5. It opposes the rotational speed sensor 13 via a predetermined radial gap (air gap). This pulser ring 18 is formed like a gear with teeth. Accordingly, it is possible to detect the rotational speed of a wheel, via the rotational speed sensor 13, based on alternative variation in magnetic fields due to rotation of the wheel hub 4.

As shown in FIG. 1, rigid fixation of the inner rings 5, 7 to the wheel hub 4 is performed by press-fitting the inner rings 5, 7 onto the cylindrical portion 4b of the wheel hub 4, via a predetermined interference. The caulked portion 11 is formed by plastically deforming the end portion of the cylindrical portion 4b radially outward. In addition, although it is shown herewith the double row tapered roller bearing, the present disclosure may be applied to a double row angular contact ball bearing using balls as rolling elements.

A shaft portion of an outer joint member, forming a constant velocity universal joint (not shown), is rotationally supported in the wheel hub 4, via rorring bearings 19, 20. The outer-side rolling bearing 19 is a deep groove ball bearing. The inner-side rolling bearing 20 is a shell type needle roller bearing.

A ring-shaped coupler ring 21 is arranged between the inner-side inner ring 7 and the caulked portion 11 of the wheel hub 4. That is, the inner ring 7 is secured on the wheel hub 4 via the coupler ring 21 like a gear member.

The coupler ring 21 is formed of chromium steel such as SCr 420 etc. It is hardened to its core by dip quenching (quenching-and-tempering) to have a hardness of 40~55 HRC (392~600 HV). The coupler ring 21 has an amount of Cr content of about 0.9~1.2% by weight. This is higher than that (i.e. about 0.12~0.2% by weight) of the wheel hub 4 formed of S53C etc. The coupler ring 21 has a higher toughness and a desirable strength due to obtaining of a difference in surface hardness of the coupler ring 21 of about 132~340 HV relative to the surface hardness 260 HV of the caulked portion 11. The coupler ring 21 may be formed of chrome molybdenum steel containing Mo of about 0.15~0.3% by weight. This suppresses the brittleness of the coupler ring 21. Thus, this surely prevents the generation of micro cracks during the caulking operation.

As shown in the enlarged view of FIG. 3(a), the coupler ring 21 is secured on the cylindrical portion 4b of the wheel hub 4. The coupling ring 21 abuts against the larger end face 7e of the inner ring 7. Splined portions (teeth) are formed on both the inner and outer circumferences of the coupler ring 21. An inner circumferential splined portion 22 includes a plurality of spline recesses 22a and a plurality of spline projections (teeth) 22b alternately formed with each other. The plurality of spline recesses 22a and projections 22b mate with a hub splined portion 23. The hub splined portion 23 includes a plurality of spline recesses 23a and a plurality of spline projections 23b alternately formed with each other on the inner side outer circumference of the cylindrical portion 4b of the wheel hub 4.

The coupler ring 21 is pressed onto the inner-side inner ring 7 by a caulking pressure from the caulked portion 11 acting on the inner-side end face 21a of the coupler ring. Furthermore, the coupler ring 21 presses the outer-side inner ring 5 adjacent to the inner-side inner ring 7 toward the shoulder portion 4a of the wheel hub 4. Thus, fixation of the coupler ring 21 and the pair of inner ring 5, 7 relative to the wheel hub 4 can be surely attained by the caulking pressure applied by the caulked portion 11.

The outer circumference of the constant velocity universal joint near the coupler ring 21 is formed with an axle-side splined portion 25 (shown by a two-dotted line). It has the same diameter and configuration as those of the outer circumferential splined portion 24 of the coupler ring 21. The outer circumferential splined portion 24 of the coupler ring 21 and the axle-side splined portion 25 are arranged coaxially with each other. The axle-side splined portion 25 is mated with an inner circumferential splined portion 26a of an axially slidable gear ring 26 (shown by a two-dotted line). When the gear ring 26 is moved toward the outer-side, the gear ring 26 mates with both the axle-side splined portion 25 and the outer circumferential splined portion 24. Thus, the driving force of the constant velocity universal joint is transmitted to the wheel hub 4. On the contrary, when the gear ring 26 is moved toward the inner side, the gear ring 26 mates with the outer-side splined portion 25 but is not mated with the outer circumferential splined portion 24. In such a manner, transmission of driving force from the constant velocity universal joint to the wheel hub 4 can be "on" or "off" by axially sliding the gearing ring 26. The actuation of the gear ring 26 can be achieved by a sliding mechanism using any driving mechanism, such as pneumatic or hydraulic power.

As shown in FIG. 3(b), the axial cross-section of the inner-side end of each spline projection 23b of the hub splined portion 23, in particular, the axial cross-section of each spline projection 23b of the hub splined portion 23 in a range between an edge "B" of the spline projection 23b and a bottom "C" of the spline recess 23a, is formed by a single circular arc with a predetermined radius of curvature "R". Accordingly, this prevents the root of caulked portion 11, after the caulking operation, from being formed with a "V"-shaped configuration and liable to be subjected to stress-concentration. Furthermore, the radius of curvature "R" is larger than a dimension "A". The dimensional "A" is measured from the inner-side end face 21a of the coupler ring 21 to the inner-side edge "B" of each spline projection 23b (R>A). Also, the radius of curvature "R" it is larger than the height "h" of each spline projection 23b (R>h). This enables the radius of the root of the caulked portion 11 to be increased. Thus, formation of the "V"-shaped configuration, which is liable to be subjected to stress-concentration, can be further prevented. A groove diameter of the spline recess 23a of the hub splined portion 23 is "Da". An inner diameter of the spline projections 22b of the inner circumferential spline 2 of the coupler ring 21 is "Db". Thus, "Db" is larger than "Da" (Db>Da). A difference "ΔD" between "Db" and "Da" (ΔD=Db−Da) is 1.0 mm or less. This assures the thickness of the root portion of the caulked portion 11, after caulking. Thus, this prevents the root portion from being deformed into the "V"-shaped configuration. Accordingly, this provides a wheel bearing apparatus that can effectively prevent the generation of cracks on the root of the caulked portion 11 of the wheel hub 4 during the caulking operation and during use of the wheel bearing apparatus.

The dimension "A" measured from the inner-side end face 21a of the coupler ring 21, to the inner-side edge "B" of each spline projection 23b, is set in a range of 2.5~3.0 mm. The radius of curvature "R" is set at R 3~7 mm. In a caulking test performed by the present applicant, a sample article with the diameter difference ΔD (=0.90 mm) and the radius of curvature of R 3~7 mm at the end face of the spline projection 23b of the hub splined portion 23 does not have the "V"-shaped configuration on the root of the caulked portion 11. Reduction and variation of the strength were not found in the caulked portion 11. On the contrary, in a sample article with the diameter difference ΔD (=1.70 mm) and the radius of curvature of R 0.8 mm at the end face of the spline projection 23b of the hub splined portion 23, a reduction and variation in the fastening strength was found.

FIG. 4(a) is a modification of the coupler ring 21 previously described. The same reference numerals as those used in the previous embodiment are also used to identify parts or portions having the same functions in this embodiment. This coupler ring 27 is provided with splined portions on both the inner and outer circumferences. The inner circumferential splined portion 28 comprises a plurality of spline recesses 28a and a plurality of spline projections 28b, alternately arranged with each other. The inner circumferential spline projections 28b are formed with tapered surfaces 29 on both their ends or at least inner-side end (caulked portion-side end).

FIG. 5 is an partially enlarged view showing a condition before caulking. A starting point "T" of the tapered surface 29 is positioned within a range between the edge "B" of the spline projection 28b of the hub splined portion 28 and the bottom "C" of the spline recess 28a. This makes it possible for the caulked portion 11 to be smoothly deformed along the inner circumference of the coupler ring 27. Thus, this prevents the root portion of the caulked portion 11 from being deformed with a "V"-shaped configuration.

FIG. 4(b) is another modification of the coupler ring 21 previously described. This coupler ring 30 includes a tapering chamfered portion 31 on a radially inward portion of at least an inner-side end (caulked portion-side end) of the coupler ring 30. The radial height "H1" of the chamfered portion 31 is set larger than the height "H0" of the spline projection 22b of the inner circumferential splined portion 22 (H1≥H0). When the coupler ring 30 mates with the hub splined portion 23, it is believed that the strength of the caulked portion 11 would be reduced by the stress concentration caused in the spline projections formed on the caulked portion 11. The root of the caulked portion 11 is bitten into by the spline recesses 22a. However, according to this embodiment, since the tapering chamfered portion 31 is formed on a radially inward portion of inner-side end corresponding to caulking-side of the coupler ring 30 and the radial height "H1" of the chamfered portion 31 is set larger than the height "H0" of the spline projection 22b of the inner circumferential splined portion 22, spline projections cannot be easily formed on the root of the caulked portion 11. Thus, it is possible to prevent stress-concentration on the spline projection formed on the caulked portion.

FIGS. 6(a)~(c) are modifications of the coupler ring 21 previously described. A coupler ring 32 of FIG. 6(a) is formed with splined portions on both the inner and outer circumferences. A tapering chamfered portion 32a is formed on at least an inner-side end of the spline recesses 33a of the inner circumferential splined portion 33 of the coupler ring 32. A coupler ring 34 of FIG. 6(b) is provided with splined portions on both the inner and outer circumferences. A circular-arc chamfered portion 34a, of a predetermined radius of curvature "r", is formed on at least an inner-side end of the spline recesses 35a of the inner circumferential splined portion 35 of the coupler ring 34. This makes it possible to increase the volume of the spline projections 22b. Thus, this avoids the stress concentration to the spline projections 22b.

A coupler ring 36 of FIG. 6(c) includes splined portions on both the inner and outer circumferences. A non-grooved portion 38 is formed on the inner-side end of the coupler ring 36. It is formed before reaching the end of the coupler ring 36. This makes it difficult for material of the root of the caulked portion 11 to bite into the spline recess of the coupler ring 36 during formation of the caulked portion 11. Thus, this makes it possible to prevent the stress concentration.

FIG. 7 is a longitudinal section view of a second embodiment of the wheel bearing apparatus. FIG. 8 is a partially enlarged view of the caulked portion of FIG. 7. FIG. 9(a) is a cross-section view of the coupler ring. FIG. 9(b) is a cross-section view of a modification of FIG. 9(a). FIG. 10 is a longitudinal section view of the wheel bearing apparatus before caulking. Since this embodiment is different only in the structure of the coupler ring from the first embodiment (FIG. 1), the same reference numerals used in the previous embodiment are also used to identify parts or portions with the same functions in this embodiment.

The wheel bearing apparatus of this embodiment is used for a driving wheel and includes an inner member 1, an outer member 2, and double row tapered rollers 3, 3, rollably contained between the inner and outer members 1, 2. The inner member 1 includes a wheel hub 4 and a pair of inner rings 5, 7 secured on the wheel hub 4, via plastic deformation of the wheel hub 4.

The outer member 2 is integrally formed with a body mounting flange 2b on its outer circumference. The outer member inner circumference includes double row tapered outer raceway surfaces 2a, 2a. The double row tapered rollers 3, 3 are freely rollably contained between the inner and outer raceway surfaces of the inner and outer members 1 and 2, via cages 8.

As shown in the enlarged view of FIG. 8, the inner ring 7 is axially secured on the wheel hub 4 by the caulked portion 11, via a coupler ring 43. The coupler ring 43 is formed with an outer circumferential splined portion (gear portion) 43a and inner circumferential splined portion 43b. The inner circumferential splined portion 43b mates with the hub splined portion 23 formed on the inner-side outer circumference of the cylindrical portion 4b of the wheel hub 4. The coupler ring 43 is pushed toward the inner ring 7 by the caulking pressure from the caulked portion 11. It abuts against the inner-side end face of the coupler ring 43. Thus, the coupler ring 43 and the pair of inner members 5, 7 can be secured on the wheel hub 4 by the caulking pressure.

A ring-shaped gear ring (sliding gear) 26, mates with a gear portion 44 of an outer joint member (not shown), can selectively mate with the outer circumferential splined portion 43a of the coupler ring 43, by axially sliding the gear ring 26. The driving power can be transmitted to wheels from the constant velocity universal joint, via the inner ring 7 and the wheel hub 4, when the coupler ring 43 and the gear portion 44 of the outer joint member are connected, via the gear ring 26. On the other hand, when the gear ring 26 is not mated with the coupler ring 43, the driving power cannot be transmitted to wheels. Thus, switching between four-wheel drive and two-wheel drive can be selectively performed.

In this embodiment, the coupler ring 43 is formed of steel including a carbon amount lesser than that of medium carbon steel. In particular, it is formed from steel containing carbon of 0.15~0.45% by weight, preferably 0.38~0.43% by weight. In addition, the coupler ring 43 is hardened to its core by dip quenching (quenching-and-tempering) to have a hardness of 40~55 HRC (392~600 HV).

The coupler ring 43 has an amount of Cr content of about 0.9~1.2% by weight. This is higher than that of the wheel hub 4 which is formed of medium/high carbon such as S53C etc. The coupler ring 43 has a higher toughness. In addition, when the coupler ring of high carbon steel is dip hardened, its hardness will be HRC 60 (700 HV). However, since it is hardened by dipping steel with a medium carbon amount, a gear tooth portion of moderate hardness will be obtained. That is, it is possible to generate a difference in surface hardness of the coupler ring 43 of about 132~340 HV relative to the surface hardness 260 HV of the caulked portion 11. This assures desirable strength in both the outer circumferential splined portion 43a and the inner circumferential splined portion 43b. Accordingly, it is possible to prevent the generation of micro cracks due to excessive stress caused in the coupler ring 43 during the caulking operation. Also, it is possible to plastically deform the end of the cylindrical portion 4b of the wheel hub 4 during the caulking operation without causing micro cracks in the caulked portion 11. Thus, this maintains the initially set bearing pre-pressure for a long term.

Chrome molybdenum steel, such as SCM440, SCM430 etc. further containing Mo of 0.15~0.3% by weight, may be used to form the coupler ring 43. Thus, it is possible to suppress brittleness, to surely prevent the generation of micro cracks during caulking operation, and to assure the strength against driving lord applied to the wheel bearing apparatus.

The bottom 43ab of the outer circumferential splined portion 43a of the coupler ring 43 may be formed with a single circular arc with a predetermined radius of curvature "R1" as shown in FIG. 9(a). Additionally, it may be possible to form the bottom 43ab' of the outer circumferential splined portion 43a' of the coupler ring 43' with two circular arcs with a predetermined radius of curvature "R1", as shown in FIG. 9(b). This makes it possible to distribute the caulking force and thus to prevent the generation of cracks on the bottom 43ab or 43ab' of the splines. The radius "R" cannot be formed in a bottom portion that is contacted by a mating tooth. Thus, a complex radius "R" is applied to a case where a single radius "R" cannot be used.

The bearing pre-pressure is managed during the step of caulking. The bearing clearance is reduced due to elastic deformation of the inner ring 7 and the coupler ring 43 caused by the caulking operation. A relative relationship between an amount of the elastic deformation and an amount of the clearance reduction, is usually prepared by a regression formula.

Tests are performed on the amounts of the elastic deformation and the clearance reduction relating to bearings having similar specification.

A bearing clearance and heights W0 of the coupler ring 43 are measured from a reference surface before caulking, as shown in FIG. 10. That is, the height W0 of the coupler ring 43 is measured when the coupler ring 43 is inserted onto the hub splined portion 23 of the cylindrical portion 4b of the wheel hub 4' until the inner circumferential splined portion 43b abuts against the larger end face 7e (FIG. 8) of the inner ring 7. A height W1 of the coupler ring 43 is measured after the caulking. An amount of reduction of the bearing clearance from a difference in heights ΔW (=W0−W1) is calculated using the regression formula where a relationship between an amount of elastic deformation and the amount of reduction of the bearing clearance has been previously defined. Finally, the bearing clearance after the caulking is calculated by subtracting the amount of reduction of the bearing clearance from the bearing clearance before the caulking.

Since the bearing clearance after the caulking is set with a negative clearance due to application of the pre-pressure, it is impossible to directly measure the negative clearance. Accordingly, it is possible, as described above, to indirectly manage the amount of pre-pressure from the amount of elastic deformation by measuring the height of the coupler ring 43 before and after the caulking and calculating the amount of elastic deformation of the inner ring 7 and the coupler ring 43. Accordingly, since the coupler ring cannot be easily subjected to plastic deformation by the caulking, it is possible to perform the pre-pressure management accurately and stably while suppressing variation in measurement.

The wheel bearing apparatus can be applied to wheel bearing apparatus of the first through third generation types where a coupler ring, able to selectively perform switching between two-wheel driving and four-wheel driving, is secured on an inner member including a wheel hub and an inner ring fit onto the wheel hub.

The present disclosure has been described with reference to the preferred embodiments and modifications. Obviously, other modifications and alternations will occur to those of ordinary skill in the art upon reading and understanding the preceding detailed description. It is intended that the present disclosure be construed to include all such alternations and modifications insofar as they come within the scope of their appended claims or equivalents.

What is claimed is:

1. A wheel bearing apparatus comprising:
an outer member formed with double row outer raceway surfaces on its inner circumference;
an inner member including a wheel hub and at least one inner ring, the wheel hub is integrally formed, on its one end, with a wheel mounting flange, a cylindrical portion axially extends from the wheel mounting flange, the at least one inner ring is press-fit onto the cylindrical portion of the wheel hub, via a predetermined interference, the inner member outer circumference includes inner raceway surfaces corresponding to the outer raceway surfaces of the outer member;
double row rolling elements are rollably contained between the inner and outer raceway surfaces of the inner and outer members, via cages;
a coupler ring, formed with an inner circumferential splined portion and an outer circumferential splined portion, is fit onto the end portion of the cylindrical portion of the wheel hub, the at least one inner ring is axially secured on the wheel hub, via the coupler ring by a caulked portion, the caulked portion is formed by plastically deforming the end of the cylindrical portion radially outward;
the inner circumferential splined portion of the coupler ring comprises a plurality of spline recesses and a plurality of spline projections alternately formed with each other and adapted to mate with a hub splined portion including a plurality of spline recesses and a plurality of spline projections alternately formed on the inner-side outer circumference of the cylindrical portion of the wheel hub;
an axial cross-section of the inner-side end of each spline projection of the hub splined portion in a range between an inner-side edge "B" of the spline projection and a bottom "C" of the spline recess is formed by a single circular arc with a predetermined radius of curvature "R", the bottom "C" of the single circular arc being tangent with a groove diameter of the spline recess of the hub splined portion "Da"; and
the radius of curvature "R" is larger than a dimension "A", measured from the inner-side end face of the coupler ring to the inner-side edge "B" of each spline projection (R>A), and is also larger than a height "h" of each spline projection (R>h).

2. The wheel bearing apparatus claim 1, wherein a groove diameter of the spline recess of the hub splined portion is "Da" and an inner diameter of the spline projections of the inner circumferential spline of the coupler ring is "Db", "Db" is larger than "Da" (Db>Da), and a difference "ΔD" between "Db" and "Da" (ΔD=Db−Da) is 1.0 mm or less.

3. The wheel bearing apparatus of claim 1, wherein a tapered surface is formed on the inner circumference of at least an inner-side end of the spline projection of the inner circumferential splined portion of the coupler ring, and wherein a starting point "T" of the tapered surface is positioned within a range between the edge "B" of the spline projection of the hub splined portion and the bottom "C" of the spline recess.

4. The wheel bearing apparatus of claim 1, wherein a tapering chamfered portion is formed on a radially inward portion of at least an inner-side end of the coupler ring, and wherein a radial height "H1" of the chamfered portion is set larger than a height "H0" of the spline projection of the inner circumferential splined portion (H1-H0).

5. The wheel bearing apparatus of claim 1, wherein a tapering chamfered portion is formed on at least an inner-side end of the spline recesses of the inner circumferential splined portion of the coupler ring.

6. The wheel bearing apparatus of claim 1, wherein a circular-arc chamfered portion of a predetermined radius of curvature "r" is formed on at least an inner-side end of the spline recesses of the inner circumferential splined portion of the coupler ring.

7. The wheel bearing apparatus of claim 1, wherein a non-grooved portion is formed on the inner-side end of the coupler ring and the spline recesses of the inner circumferential splined portion are formed before reaching the end of the coupler ring.

8. The wheel bearing apparatus of claim 1, wherein the coupler ring is formed from steel containing a carbon amount same or less than that of medium-high carbon steel, and a hardness of the outer circumferential splined portion is set same as that of the inner circumferential splined portion.

9. The wheel bearing apparatus of claim 1, wherein a difference in surface hardness between the coupler ring and the wheel hub is at least 130 HV.

10. The wheel bearing apparatus of claim 1, wherein the coupler ring is formed of steel containing Cr of 0.9~4.2% by weight and the surface hardness of the coupler ring is set within a range of 392~600 HV.

11. The wheel bearing apparatus of claim 1, wherein the coupler ring is formed of steel containing a carbon amount of 0.15~0.45% by weight.

12. The wheel bearing apparatus of claim 1, wherein the coupler ring is formed from chrome steel containing Cr of 0.9~4.2% by weight and hardened by a quench-and-temper treatment.

13. The wheel bearing apparatus claim 1, wherein the coupler ring is formed from chrome molybdenum steel containing Mo of 0.15~0.3% by weight.

14. The wheel bearing apparatus of claim 1, wherein a bottom of the outer circumferential splined portion of the coupler ring is formed with a circular arc with a predetermined radius of curvature (R1).

15. The wheel bearing apparatus of claim 1, wherein an outer joint member forming a constant velocity universal joint is connected to the inner member, the outer circumference of the outer joint member is formed with an axle-side splined portion with a same diameter and configuration as those of the outer circumferential splined portion of the coupler ring, the outer circumferential splined portion of the coupler ring and the axle-side splined portion are arranged coaxially with each other, and the axle-side splined portion is mated with an inner circumferential splined portion of an axially slidable gear ring for switching the driving force.

16. The wheel bearing apparatus of claim 1, wherein the wheel hub is formed of medium-high carbon steel containing carbon amount of 0.40~0.80% by weight, the wheel hub is hardened by high frequency induction hardening so that a predetermined hardened layer is formed with a surface hardness of 58~64 HRC in a region of the wheel hub from an inner-side base of the wheel mounting flange to the cylindrical portion and the caulked portion is not hardened and remains as is with surface hardness after forging.

17. A wheel bearing apparatus comprising:
an outer member formed with double row outer raceway surfaces on its inner circumference;
an inner member including a wheel hub and at least one inner ring, the wheel hub is integrally formed, on its one end, with a wheel mounting flange, a cylindrical portion axially extends from the wheel mounting flange, the at least one inner ring is press-fit onto the cylindrical portion of the wheel hub, via a predetermined interference, the inner member outer circumference includes inner raceway surfaces corresponding to the outer raceway surfaces of the outer member;
double row rolling elements are rollably contained between the inner and outer raceway surfaces of the inner and outer members, via cages;
a coupler ring, formed with an inner circumferential splined portion and an outer circumferential splined portion, is fit onto the end portion of the cylindrical portion of the wheel hub, the at least one inner ring is axially secured on the wheel hub, via the coupler ring by a caulked portion, the caulked portion is formed by plastically deforming the end of the cylindrical portion radially outward;
the inner circumferential splined portion of the coupler ring comprises a plurality of spline recesses and a plurality of spline projections alternately formed with each other and adapted to mate with a hub splined portion including a plurality of spline recesses and a plurality of spline projections alternately formed on the inner-side outer circumference of the cylindrical portion of the wheel hub;
an axial cross-section of the inner-side end of each spline projection of the hub splined portion is formed by a single circular arc with a predetermined radius of curvature "R";
the radius of curvature "R" is larger than a dimension "A", measured from the inner-side end face of the coupler ring to the inner-side edge "B" of each spline projection (R>A), and is also larger than a height "h" of each spline projection (R>h); and
a tapered surface is formed on the inner circumference of at least an inner-side end of the spline projection of the inner circumferential splined portion of the coupler ring, and wherein a starting point "T" of the tapered surface is positioned within a range between the edge "B" of the spline projection of the hub splined portion and the bottom "C" of the spline recess.

18. A wheel bearing apparatus comprising:
an outer member formed with double row outer raceway surfaces on its inner circumference;
an inner member including a wheel hub and at least one inner ring, the wheel hub is integrally formed, on its one end, with a wheel mounting flange, a cylindrical portion axially extends from the wheel mounting flange, the at least one inner ring is press-fit onto the cylindrical portion of the wheel hub, via a predetermined interference, the inner member outer circumference includes inner raceway surfaces corresponding to the outer raceway surfaces of the outer member;
double row rolling elements are rollably contained between the inner and outer raceway surfaces of the inner and outer members, via cages;
a coupler ring, formed with an inner circumferential splined portion and an outer circumferential splined portion, is fit onto the end portion of the cylindrical portion of the wheel hub, the at least one inner ring is axially secured on the wheel hub, via the coupler ring by a caulked portion, the caulked portion is formed by plastically deforming the end of the cylindrical portion radially outward and the coupler ring is formed from steel containing a carbon amount same or less than that of medium-high carbon steel, and a hardness of the outer circumferential splined portion is set same as that of the inner circumferential splined portion;
the inner circumferential splined portion of the coupler ring comprises a plurality of spline recesses and a plurality of spline projections alternately formed with each other and adapted to mate with a hub splined portion including a plurality of spline recesses and a plurality of spline projections alternately formed on the inner-side outer circumference of the cylindrical portion of the wheel hub;
an axial cross-section of the inner-side end of each spline projection of the hub splined portion is formed by a single circular arc with a predetermined radius of curvature "R"; and
the radius of curvature "R" is larger than a dimension "A", measured from the inner-side end face of the coupler ring to the inner-side edge "B" of each spline projection (R>A), and is also larger than a height "h" of each spline projection (R>h).

19. A wheel bearing apparatus comprising:
an outer member formed with double row outer raceway surfaces on its inner circumference;

an inner member including a wheel hub and at least one inner ring, the wheel hub is integrally formed, on its one end, with a wheel mounting flange, a cylindrical portion axially extends from the wheel mounting flange, the at least one inner ring is press-fit onto the cylindrical portion of the wheel hub, via a predetermined interference, the inner member outer circumference includes inner raceway surfaces corresponding to the outer raceway surfaces of the outer member;

double row rolling elements are rollably contained between the inner and outer raceway surfaces of the inner and outer members, via cages;

a coupler ring, formed with an inner circumferential splined portion and an outer circumferential splined portion, is fit onto the end portion of the cylindrical portion of the wheel hub, the at least one inner ring is axially secured on the wheel hub, via the coupler ring by a caulked portion, the caulked portion is formed by plastically deforming the end of the cylindrical portion radially outward and the coupler ring is formed of steel containing Cr of 0.9~1.2% by weight and the surface hardness of the coupler ring is set within a range of 392~600 HV;

the inner circumferential splined portion of the coupler ring comprises a plurality of spline recesses and a plurality of spline projections alternately formed with each other and adapted to mate with a hub splined portion including a plurality of spline recesses and a plurality of spline projections alternately formed on the inner-side outer circumference of the cylindrical portion of the wheel hub;

an axial cross-section of the inner-side end of each spline projection of the hub splined portion is formed by a single circular arc with a predetermined radius of curvature "R"; and the radius of curvature "R" is larger than a dimension "A", measured from the inner-side end face of the coupler ring to the inner-side edge "B" of each spline projection (R>A), and is also larger than a height "h" of each spline projection (R>h).

\* \* \* \* \*

UNITED STATES PATENT AND TRADEMARK OFFICE
CERTIFICATE OF CORRECTION

PATENT NO. : 9,315,069 B2
APPLICATION NO. : 14/136333
DATED : April 19, 2016
INVENTOR(S) : Kazuo Komori It is certified that error appears in the above-identified patent and that said Letters Patent is hereby corrected as shown below:

In the claims:

Column 16

Line 45, claim 4    "(H1-H0)" should be --(H1≧H0)--.

Column 17
Line 2, claim 10    "0.9~4.2%" should be --0.9~1.2%--.
Line 10, claim 12   "0.9~4.2%" should be --0.9~1.2%--.

Signed and Sealed this
Second Day of August, 2016

Michelle K. Lee
*Director of the United States Patent and Trademark Office*